Nov. 1, 1966  N. L. GROSTICK  3,283,092
LIQUID LEVEL INDICATOR
Filed April 15, 1963  2 Sheets-Sheet 1
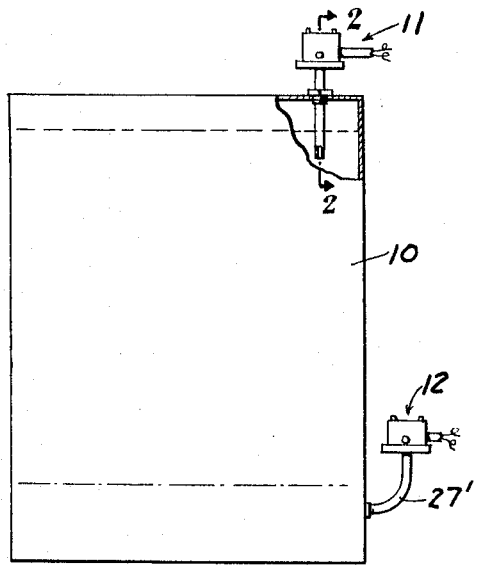
FIG. 1
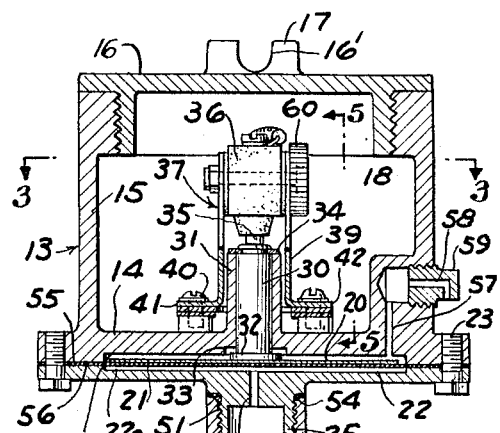
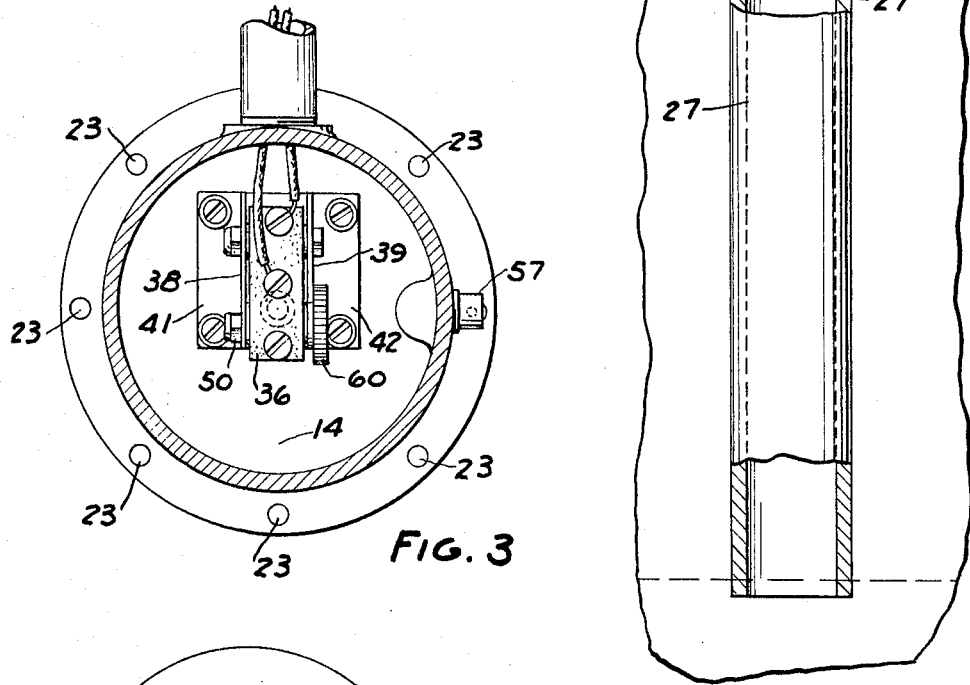
FIG. 2
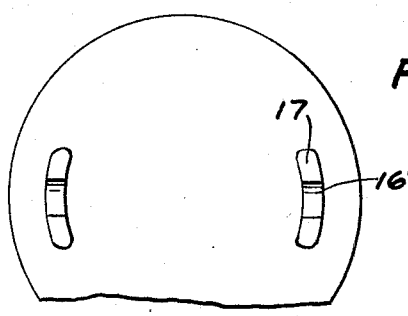
FIG. 4
FIG. 3
INVENTOR.
NORMAN L. GROSTICK
BY
Barnes, Kisselle, Lairch & Choate
ATTORNEYS

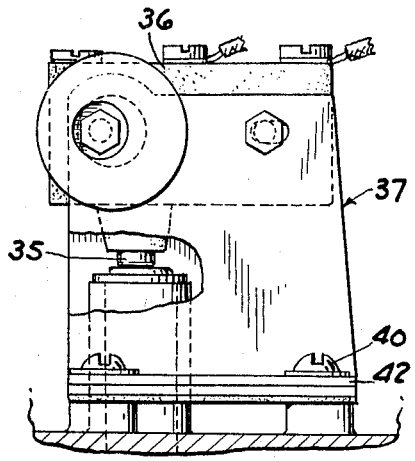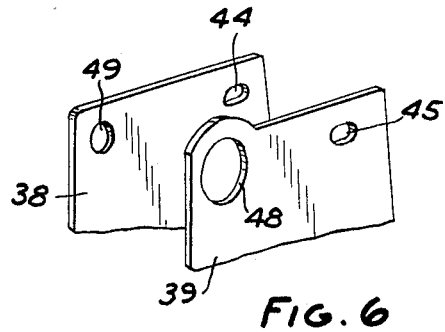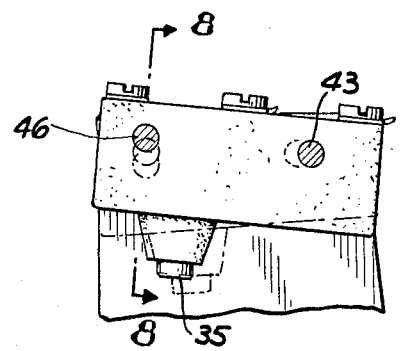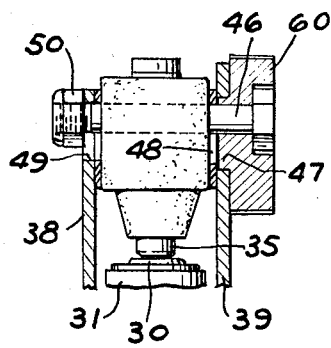

United States Patent Office 3,283,092
Patented Nov. 1, 1966

3,283,092
LIQUID LEVEL INDICATOR
Norman L. Grostick, Lexington, Mich., assignor to The Bin-Dicator Company, Detroit, Mich., a corporation of Michigan
Filed Apr. 15, 1963, Ser. No. 272,890
6 Claims. (Cl. 200—61.2)

This invention relates to liquid level indicators for indicating when the level of a liquid or slurry contained in a storage bin or tank reaches or falls below a predetermined level.

It is an object of the invention to provide a simple inexpensive tank level indicator which will quickly and efficiently indicate when the level of a liquid or slurry reaches or falls below a predetermined level.

It is a further object of the invention to provide such a liquid level indicator which can be manufactured at low cost.

It is a further object of the invention to provide a diaphragm type indicator having novel means for adjusting the position of a sensing switch adjacent the diaphragm.

In the drawings:

FIG. 1 is a partly diagrammatic view of a storage tank showing two liquid level indicators in position.

FIG. 2 is a fragmentary sectional view on an enlarged scale taken along the line 2—2 in FIG. 1.

FIG. 3 is a fragmentary sectional view taken along the line 3—3 in FIG. 2.

FIG. 4 is a fragmentary plan view of the cover utilized in the liquid level indicator.

FIG. 5 is a fragmentary sectional view on an enlarged scale taken along the line 5—5 in FIG. 2.

FIG. 6 is a fragmentary perspective view of a bracket utilized in FIG. 5.

FIG. 7 is a fragmentary view similar to FIG. 5 parts being broken away and the switch being shown in a different operative position.

FIG. 8 is a fragmentary sectional view taken along the line 8—8 in FIG. 7.

Referring to FIG. 1, the invention relates to a liquid level indicator for indicating when the level of liquid or slurry in a storage tank 10 reaches or falls below a predetermined level. Thus, as shown in FIG. 1, a liquid level indicator 11 is provided adjacent the upper end of the tank 10 for indicating when the level reaches a predetermined maximum and a liquid level indicator 12 is provided at the lower end of the tank for indicating when the liquid level reaches a predetermined minimum.

As shown in FIGS. 2 and 3, the liquid level indicator includes a housing 13 comprising a bottom wall 14, cylindrical side wall 15 and a removable top wall or plate 16 that is threaded into the side wall 15 and is tightened therein by engaging a tool with spaced slots 16' on projection 17 provided in the upper surface of the cover 16. The housing 13 thereby provides a closed chamber 18 in which a switch is mounted and adapted to be actuated by a diaphragm as presently described.

The undersurface of the bottom wall 14 is formed with a recess or space 19 in which a circular back-up disc 20 is positioned. The back-up disc 20 is made of rigid material such as metal. A diaphragm 21 preferable made of rubber with a Teflon face is clamped adjacent the bottom wall by a bottom plate 22 and bolts 23. The bottom plate 22 is formed with a recess 22a complementary to recess 19 and with a small centrally located opening 24 having a cross section many times less than the cross section of the spaces 19 and 22a and providing communication through a nipple 25 formed integrally on bottom plate 22. A short section of pipe 26 is threaded on nipple 25. A secondary pipe or riser 27 is threaded on the lower end of the nipple 26 and also into the wall of the tank 10. As shown in FIG. 1, the pipe 27 is threaded into the top wall of the tank 10 and extends vertically downwardly in position so that level indicator 11 will indicate when the level of the liquid reaches a predetermined maximum. In the case where the liquid level indicator 12 is intended to indicate when a liquid level reaches a predetermined minimum, the pipe or riser 27' is bent as shown in FIG. 1 and extends through the side wall of the tank 10 adjacent the bottom of the tank.

The arrangement provides for the entrapment of a captive column of air in the pipe 27 adjacent the diaphragm 21. In the case where the liquid level indicator is used to indicate a maximum level, when the liquid rises to the bottom of the tube 27, it entraps an air column and as the level rises further, the pressure becomes sufficient to readily pass through the opening 24 and flex the diaphragm upwardly into space 19 and, in turn, actuate the switch as presently described. Where the liquid level indicator is used as at 12 to record when the level falls below a predetermined level, the tube 27' operates to entrap an air column adjacent the diaphragm and as the level lowers, the pressure of the air in the air column diminishes permitting the diaphragm to flex in the opposite direction out of space 19. The switch can be wired to go on or off depending upon whether it is desired to provide a signal when the diaphragm flexes into or out of space 19.

Referring to FIG. 2, 3 and 5–8, a plunger 30 is slidably mounted in an integral tube 31 on bottom wall 14 with its axis in alignment with the center of the back-up disc 20 and diaphragm 21. The lower end of the plunger is flanged as at 32 and is adapted to engage a recess 33 in bottom wall 14 to limit the inward movement of the plunger 30 relative to the housing 13. A C-shaped spring washer 34 is provided in a groove at the upper end of the plunger 30 to engage the end of the tube 31 and limit the outward movement of the plunger. The flexing of the diaphragm 21 is adapted to move the plunger 30 and, in turn, the actuator 35 of a microswitch 36 mounted on a bracket 37 in the chamber formed by housing 13. As shown in FIGS. 5–8, bracket 37 comprises spaced plates 38, 39 supported on the upper part of the bottom wall 14 by screws 40 extending through flanges 41, 42 bent outwardly from the walls 38, 39. Microswitch 36 is provided with a bolt 43 adjacent one end thereof. The ends of said bolt 43 extend laterally outwardly from the sides thereof into elongated openings 44, 45 formed in the upper ends of the walls 38, 39, respectively, so that one end of the switch 36 is mounted between walls 38, 39 for swinging and longitudinal movement horizontally. At its other end, the microswitch 36 is provided with a second bolt 46 which has one end thereof extending through a vertically elongated slot 49 in the wall 38. The other end of the bolt 46 extends through a circular projection 47 that is rotatably mounted in a circular opening 48 in the wall 39. The projection 47 is provided with a circular knob 60.

The bolt 46 passes through the projection 47 eccentrically, that is, with its axis out of alignment with the axis of the projection. By this arrangement, when the knob 60 is rotated, the projection 47 rotates relative to the wall 39 and since the bolt 46 is eccentric, the pin moves upwardly and downwardly in a general arc. The elongated slots 44, 45 permit a slight forward and backward movement of the switch 36 which occurs because of this action. In order to lock the switch in any adjusted position, a lock nut 50 is threaded on the end of the bolt 46. The actuator 35 of the microswitch 36 overlies the end of the plunger 30 (FIG. 5) at all times in the various positions of the microswitch 36.

In order to insure the entrapment of a column of air adjacent the outer surface of the diaphragm, the pipe 26 is required so that the housing 13 will not be positioned directly against the side or top of the tank 10. In order to prevent inadvertent removal of the pipe 26 and placement of the housing directly on the tank, the threads 51 between the upper end of the pipe 26 and the nipple 25 are straight and the threads 52 between the lower end of the pipe 26 and the riser 27 and threads 53 between the riser 27 and the tank 10 are tapered. An O-ring 54 is provided between the upper end of the pipe 26 and a shoulder on the nipple 25 to insure a proper seal. Further, in order to insure a proper seal, the faces 55, 56 on the bottom wall 14 and bottom plate 22, which engage the periphery of the diaphragm 21, are made accurately as by lapping and a plurality of bolts 23 are used to insure a proper seal. The space 19 and openings 24 are maintained at a minimum in order that a minimum compression of the air column in the pipe 26 will produce a flexing of the diaphragm 21.

In order to prevent any drag or delay that might occur due to compression of air in the housing chamber by the diaphragm when it moves upwardly or due to vacuum in the housing chamber when the diaphragm moves downwardly, a vent passage 57 in the housing communicates with a vent 58 in a nipple 59 that extends to the atmosphere surrounding housing 13.

It can thus be seen that there has been provided a simple, efficient relatively inexpensive liquid level indicator. The device provides liquid level indication without any moving parts in the tank or in direct contact with the liquid being measured. In addition, there has been provided a diaphragm operated indicator which has a simple means for adjusting the position of the switch relative to the diaphragm with a minimum of tools.

I claim:
1. In a sensing device which includes a housing and a diaphragm on the housing movable in response to differential pressure on opposite sides thereof, a switch adjacent one of said sides of said diaphragm and adapted to be actuated by movement of said diaphragm, means for mounting and adjusting the position of said switch toward and away from said diaphragm which comprises
support means on which said switch is mounted,
a bracket member mounted on said housing,
and eccentric means between said support means and said bracket means for universally moving said support member and, in turn, said switch toward and away from said diaphragm.

2. In a sensing device which includes a housing and a diaphragm on the housing movable in response to differential pressure on opposite sides thereof, a switch adjacent one of said sides of said diaphragm and adapted to be actuated by movement of said diaphragm, means for mounting and adjusting the position of said switch toward and away from said diaphragm which comprises
support means on which said switch is mounted,
bracket means mounted on said housing,
means for pivoting said support means on said bracket means for swinging and limited longitudinal movement transverse to the pivot axis of said pivoting means,
and means between said support means and said bracket means comprising eccentric means spaced from said pivoting means for longitudinally moving and pivoting said support means relative to said bracket means.

3. The combination set forth in claim 2 wherein said eccentric means comprises
a circular opening in said bracket means,
and a cam member rotatably mounted on said switch and having a circular projection extending into said opening in said bracket means,
said switch being mounted on said circular projection eccentrically of said circular projection of said cam member.

4. In a sensing device which includes a housing and a diaphragm on the housing movable in response to differential pressure on opposite sides thereof, a switch adjacent one of said sides of said diaphragm and adapted to be actuated by movement of said diaphragm, means for mounting and adjusting the position of said switch toward and away from said diaphragm which comprises
bracket means comprising a pair of spaced walls,
means for pivoting said switch between said spaced walls for limited swinging and longitudinal movement,
one of said walls having a circular opening therein,
a cam member having a cylindrical projection extending into said opening,
means for pivotally mounting said switch on said cam member eccentrically of said projection,
and means for rotating said cam member in said circular opening to move said switch toward and away from said diaphragm.

5. The combination set forth in claim 4 including means for locking said switch in adjusted position on said bracket means.

6. A liquid level indicator comprising a housing having a bottom, top and side walls defining an enclosed chamber, said bottom wall having a shallow depression on the side of said bottom wall remote from said chamber, a bottom plate secured to said bottom wall and adapted to form with said shallow depression a diaphragm chamber between said bottom wall and bottom plate, a diaphragm marginally clamped between said bottom wall and said bottom plate and adapted for movement in said diaphragm chamber, a second plate disposed on the side of said diaphragm facing said bottom wall, said bottom plate having an opening therein of substantially small cross section in relation to the cross section of the diaphragm chamber, a rigid mounting tube secured to said bottom plate and having a substantially larger cross section than said bottom plate opening and communicating therewith, said tube having a length adapted to extend to an opening in a wall of a container of liquid and the like to mount and support the housing and, in turn, the diaphragm in spaced relation to the wall of the container and such that the interior of said tube forms an isolating trapped air chamber between said diaphragm and the liquid in the container, said bottom wall of said housing having a tubular portion projecting into said enclosed chamber substantially axially aligned with said bottom plate opening, a plunger disposed with a sliding fit for limited axial movement in said tubular portion of said bottom wall and at the lower limit of its travel extending beyond said tubular portion at one end into said enclosed chamber and at the other end into said diaphragm chamber to about the midpoint position of said diaphragm therein, a switch adjustably mounted within said enclosed chamber adapted to be operated by movement of said plunger, said plunger having means fixed adjacent said one end thereof adapted to engage said tubular portion of said bottom wall and thereby limit movement of said other end of said plunger into said diaphragm chamber to about the midpoint position of said diaphragm intermediate said bottom wall and said bottom plate, and vent means in said housing communicating at one end with said diaphragm chamber between said diaphragm and said bottom wall and at the other end with atmosphere outside said housing.

References Cited by the Examiner

UNITED STATES PATENTS

| | | | |
|---|---|---|---|
| 640,879 | 1/1900 | Davis | 285—177 X |
| 3,002,064 | 9/1961 | Nielsen | 200—83 |
| 3,043,225 | 7/1962 | Neilsen | 200—83 X |

FOREIGN PATENTS 118,999    3/1927    Switzerland.

BERNARD A. GILHEANY, *Primary Examiner.*

R. N. ENVALL, Jr., *Assistant Examiner.*